United States Patent
Naganawa et al.

(10) Patent No.: US 8,471,428 B2
(45) Date of Patent: Jun. 25, 2013

(54) ROTATING ELECTRICAL MACHINE

(75) Inventors: Takashi Naganawa, Kasumigaura (JP); Kenji Miyata, Hitachinaka (JP); Takashi Ishigami, Hitachinaka (JP); Yoshihisa Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 12/846,432

(22) Filed: Jul. 29, 2010

(65) Prior Publication Data

US 2011/0025162 A1 Feb. 3, 2011

(30) Foreign Application Priority Data

Jul. 31, 2009 (JP) .................. 2009-178581

(51) Int. Cl.
*H02K 3/28* (2006.01)
(52) U.S. Cl.
USPC ............ 310/208; 310/195; 310/198; 310/184
(58) Field of Classification Search
USPC ........................... 310/179–184, 208
See application file for complete search history.

(56) References Cited

U.S. PATENT DOCUMENTS

2007/0057592 A1* 3/2007 Bhargava ................... 310/184
2008/0174199 A1* 7/2008 Ishigami et al. ............. 310/199

FOREIGN PATENT DOCUMENTS

JP 6-165422 A 6/1994

* cited by examiner

*Primary Examiner* — Tran Nguyen
*Assistant Examiner* — Leda Pham
(74) *Attorney, Agent, or Firm* — Crowell & Moring LLP (57) ABSTRACT

A rotating electrical machine includes a rotor, in which a plurality of magnetic poles are provided in circumferential direction, and a stator, within which the rotor is disposed. In the stator, two stator magnetic poles are formed by winding coils of one phase and by a stator core of the stator within 360° of electrical angle defined by the magnetic poles of the rotor. The coils that form respective stator magnetic poles have angular widths in circumferential direction of less than 180° of electrical angle, the coils that form the respective two stator magnetic poles are provided so as not to mutually overlap and are wound so that adjacent ones of the stator magnetic poles have mutually opposite polarities, and, in the stator, each winding of each coil consists of an external bridge wire, a turn portion, an internal bridge wire, and a turn portion, in that order.

5 Claims, 12 Drawing Sheets

ROTATING ELECTRICAL MACHINE

INCORPORATION BY REFERENCE

The disclosure of the following priority application is herein incorporated by reference: Japanese Patent Application No. 2009-178581 filed Jul. 31, 2009.

BACKGROUND OF THE INVENTION

1. Field of the Invention

The present invention relates to a rotating electrical machine.

2. Description of the Related Art

The methods of distributed winding and concentrated winding and so on are per se known as methods for constructing the stator coils of a rotating electrical machine. Among these, a winding construction is per se known (refer to Japanese Laid-Open Patent Publication H06-165422) that comprises a first three-phase connected coil in which three stator coils are wound upon the teeth of a stator core in a short-pitch lap winding at the magnetic pole pitch of a rotor and are three-phase connected, and a second three-phase connected coil in which three stator coils are wound upon the teeth of the stator core in a short-pitch lap winding, each displaced by π/3 radian (60°) of electrical angle with respect to the stator coils of the first three-phase connected coil, and are three-phase connected, similar to the first three-phase connected coil.

SUMMARY OF THE INVENTION

In the light of current energy problems, there are great demands for increase of the efficiency of rotating electrical machines. However, since the technique described above is theoretically a concentrated winding, in the interlinkage magnetic flux with the rotor, the stator coil for each one phase only takes advantage of a 120° region of electrical angle, and this is in contrast to a distributed winding with which the entire 360° region of electrical angle is taken advantage of, and accordingly it becomes difficult to obtain any further increase of efficiency.

Although each one of the distributed windings includes both a full-pitch winding and a short-pitch winding, in this structure, over any actual electrical angle, the coil for each of the phases is wound upon the teeth of the stator by winding part of the coil over 180° and by winding the remainder of 180° in the opposite orientation. Accordingly, the amount of interlinkage magnetic flux becomes larger, due to linking of the magnetic flux induced by the electrical current flowing in the coil within the coil itself, so that the inductance of the coil becomes comparatively large. Due to this, in a generator, the amount of current generated in the high rotational speed region is held down, and, in a motor, while in a motor, the control responsiveness of the coil currents becomes worse.

Thus, an object of the present invention is to provide a rotating electrical machine that is compact and has high output, and in which a stator upon which coils are wound is appropriately manufactured so that two stator magnetic poles formed by in-phase coil turns are disposed within 360° of electrical angle as defined by the magnetic poles of the rotor.

According to the 1st aspect of the present invention, a rotating electrical machine comprising; a rotor in which a plurality of magnetic poles are provided in circumferential direction, and a stator within the rotor is disposed with a gap against the rotor, wherein;

two stator magnetic poles are formed by winding coils in phase and by the stator core within 360° of electrical angle defined by the magnetic poles of the rotor;

the coil turns that form respective stator magnetic poles have angular widths in circumferential direction of less than 180° of electrical angle;

the coil turns that form the respective two stator magnetic poles are provided so as not to mutually overlap and are wound so that adjacent ones of the stator magnetic poles have mutually opposite polarities, and;

in the stator, each winding of each coil consists of an external bridge wire, a turn portion, an internal bridge wire, and a turn portion in that order.

According to the 2nd aspect of the present invention, in a rotating electrical machine according to the 1st aspect, it is preferred that the external bridge wires or the internal bridge wires are formed in a letter-S shape as seen along axial direction.

According to the 3rd aspect of the present invention, in a rotating electrical machine according to the 1st aspect, it is preferred that the external bridge wires or the internal bridge wires are formed in a peaked shape as seen along radial direction.

According to the 4th aspect of the present invention, in a rotating electrical machine according to the 1st aspect, it is preferred that the external bridge wires or the internal bridge wires correspond to mutually different phases.

According to the 5th aspect of the present invention, in a rotating electrical machine according to the 4th aspect, it is preferred that neighboring ones of the external bridge wires or the internal bridge wires are formed so as to overlap, and so as not to intersect one another.

According to the 6th aspect of the present invention, in a rotating electrical machine according to 1st aspect, it is preferred that the external bridge wires or the internal bridge wires constitute mutually overlapping groups, and the electrical angle over which each group is defined is 360°.

According to the 7th aspect of the present invention, in a rotating electrical machine according to 6th aspect, it is preferred that the electrical angles of each group of the external bridge wires or the internal bridge wires differ by 180°.

While maintaining the advantage of a distributed winding stator of possessing excellent rotational characteristics, it is possible to make this rotating electrical machine more compact and to increase its efficiency.

DESCRIPTION OF THE PREFERRED EMBODIMENTS

The embodiments explained below are related to a rotating electrical machine such as a motor or a generator or the like and to a method of manufacture thereof, and particularly relate to a rotating electrical machine that is equipped with a dispersal winding coil made by a thick wire lap winding method, and to a method of manufacture thereof.

Figure 1A:
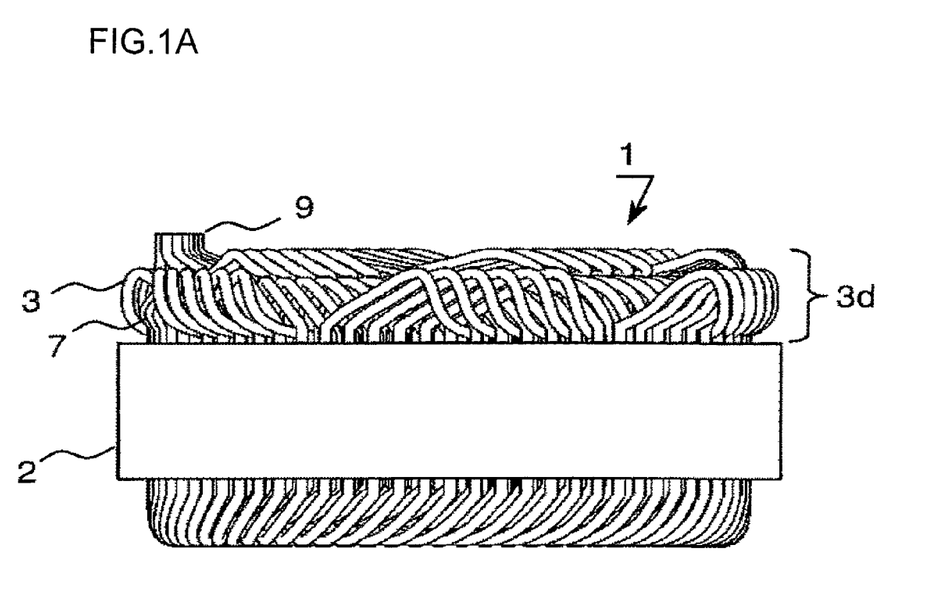
FIG. 1A is an elevation view of a stator to which is assembled a dispersal winding coil according to an embodiment of the present invention.
Figure 1B:
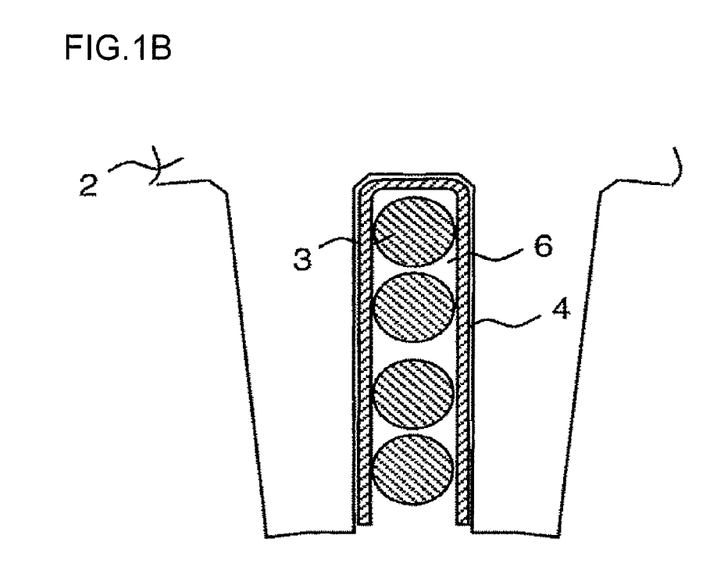
FIG. 1B is an enlarged transverse sectional view of a slot portion of the stator.

FIG. 1 shows a stator 1 according to the present invention, upon which coils are wound so that two stator magnetic poles formed by in-phase coils are disposed within 360° of electrical angle as defined by the magnetic poles of the rotor. In the following, a coil that has been made by this type of winding will be termed a "dispersal winding coil".

FIG. 1A is an elevation view showing this stator 1 as seen from its side: dispersal winding coils 7 are installed upon a stator core 2, and terminal portions 9 of wires 3 are connected thereto. With this structure, the height of the coil end portion 3d becomes low.

FIG. 1B is an enlarged sectional view of a portion of this stator core 2 that includes a stator core slot 6. The stator core 2 is made from silicon steel plate of thickness around 0.35 mm or the like by die cutting and lamination. The wire 3 is a conducting wire having an insulating covering layer, and, in this embodiment, it is made by covering a conductor from copper with polyamide-imide resin. This wire 3 covered with insulating layer is disposed in the stator core slot 6 of the stator core 2. By surrounding the wire 3 with insulating material 4, its insulation is improved. Surrounding the wire 3 with the insulating material 4 serves as a countermeasure for ensuring insulation against any pin holes that may by an unlikely chance be present in the resin enamel cover layer that covers the surface of the wire rod 3, and also serves to prevent damage to the resin enamel cover layer during installation of the wire 3 upon the stator core. The wire 3 in this figure is a round circular wire whose cross section is circular, and a construction is adopted in which four of these wires 3 are disposed along the axial direction of the stator core slot 6 of the stator core 2.

A magnet rotor (not shown in the drawings) or a squirrel-cage type copper rotor (also not shown) is installed coaxially in the interior of this stator 1, with both ends of this rotor being rotatably supported in bearings, and this assembly constitutes an electric motor or a generator.

Figure 2A:
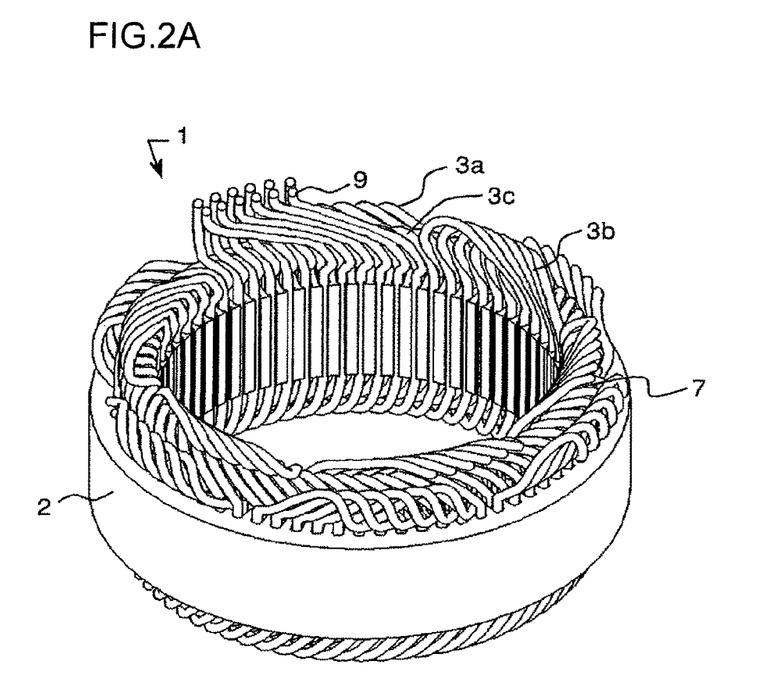
FIG. 2A and FIG. 2B are respectively a perspective view and a plan view of this stator to which are assembled dispersal winding coils according to an embodiment of the present invention, as seen from a terminal portion side thereof.
Figure 2B:
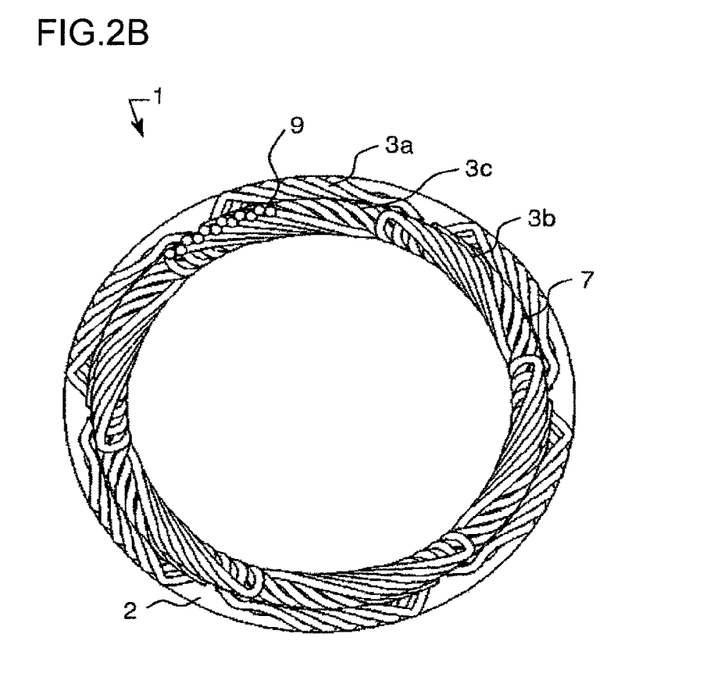

FIG. 2 shows the terminal portion 9 side of this stator 1 in which the dispersal winding coils 7 are installed upon the stator core 2.

FIG. 2A is a perspective view showing the stator 1 as seen from the side of the terminal portion 9: the dispersal winding coils 7 are made as a succession of external bridge wires 3a, turn portions 3c, and internal bridge wires 3b. And FIG. 2B is a plan view showing the stator 1 as seen from the side of the terminal portion 9: when seen from the axial direction, the external bridge wires 3a and the internal bridge wires 3b have shapes like a schematic letter-S. The external bridge wires 3a are arranged radially inward of the external diametrical surface of the stator core 2, while the internal bridge wires 3b are arranged radially outward of the internal diametrical surface of the stator core 2. Furthermore, in a preferred configuration, this stator 1 is built with neighboring ones of the external bridge wires 3a and/or neighboring ones of the internal bridge wires 3b being arranged so as to be mutually overlapped while not intersecting one another, so that the bridge wires do not occupy an excessively great space.

Figure 3A:
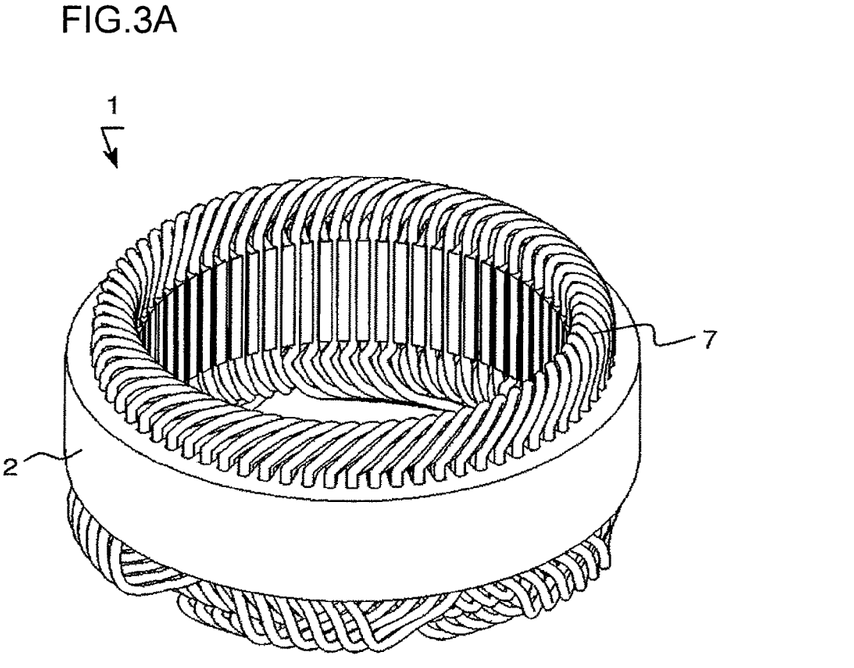
FIG. 3A and FIG. 3B are respectively a perspective view and a plan view of this stator to which are assembled dispersal winding coils according to an embodiment of the present invention, as seen from a non-terminal portion side thereof.
Figure 3B:
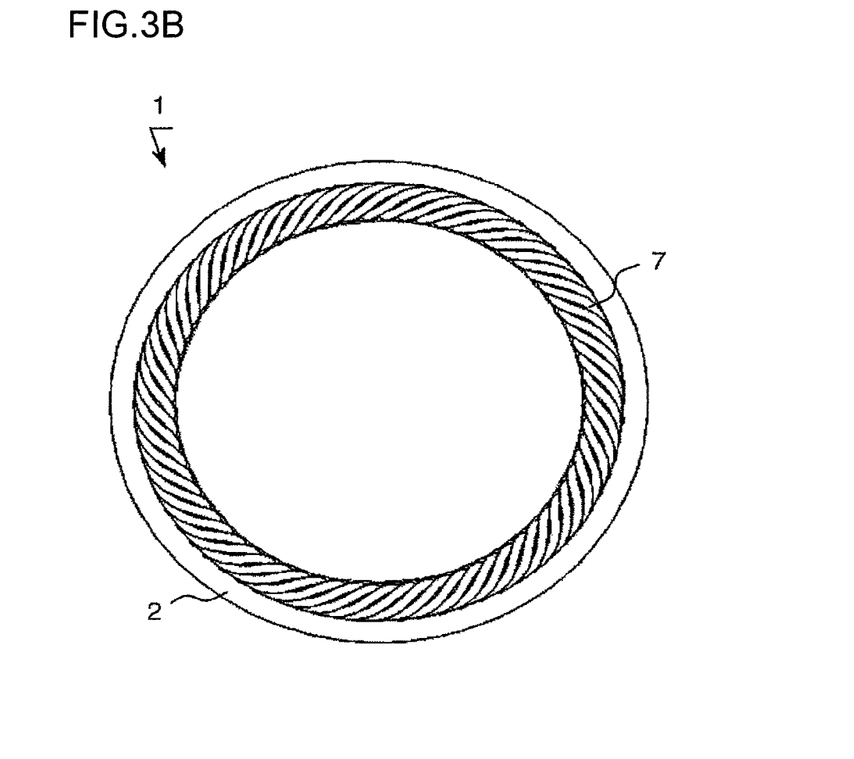

FIG. 3A shows the non-terminal portion side of this stator 1 in which the dispersal winding coils 7 are installed upon the stator core 2. FIG. 3A is a perspective view showing this stator 1 as seen from the side of its non-terminal portion, while FIG. 3B is a plan view showing the stator 1 as seen from its non-terminal portion side. An appropriate structure is adopted, in which the dispersal winding coils 7 are arranged within a range between the internal and the external diameters of the stator core 2, so as not to occupy an excessively great space.

Figure 4:
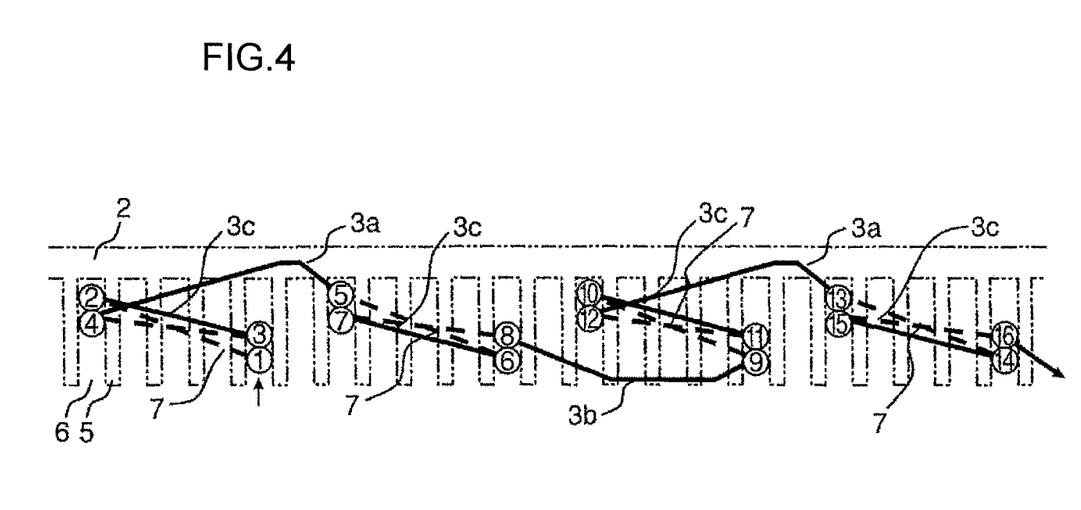
FIG. 4 is a developed view, seen from the top, showing the structure of one of the dispersal winding coils of this embodiment of the present invention.
Figure 5:
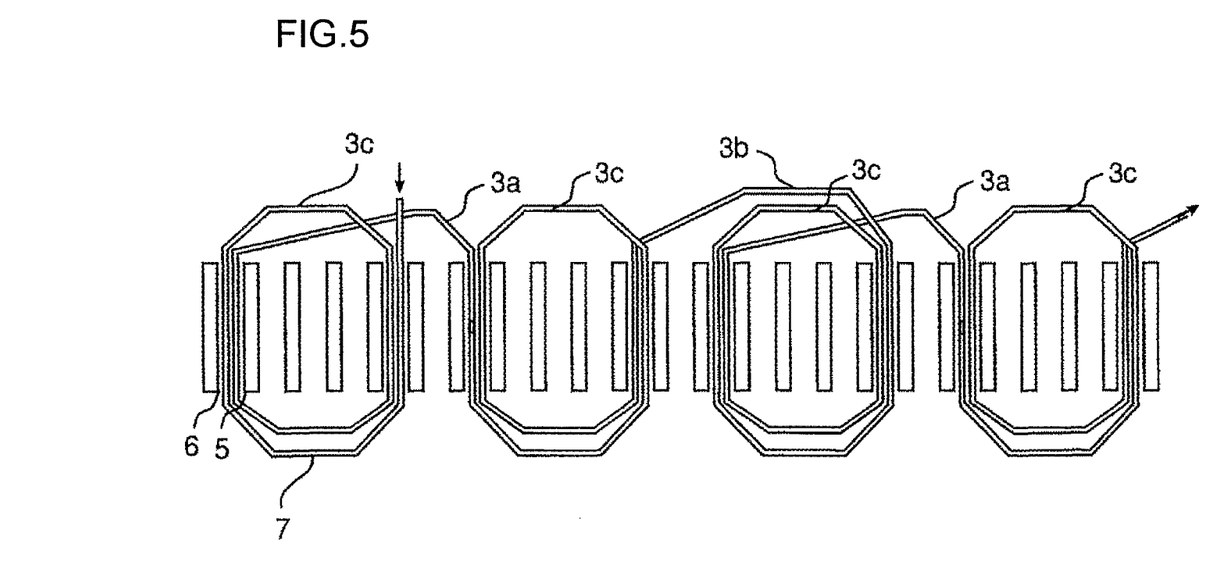
FIG. 5 is a developed view, seen from the side, showing the structure of one of the dispersal winding coils of this embodiment of the present invention.

FIGS. 4 and 5 are schematic figures in which one of the dispersal winding coils 7 disposed upon the stator core 2 is partially shown. FIG. 4 is a schematic figure showing the stator core 2 and the dispersal winding coil 7 developed in a linear format as seen from the terminal portion side of the stator 1. The circled numbers show the order of arrangement in which the dispersal winding coils 7 are formed: the winding coils are arranged in the order of their numerals, i.e. (1)→(2)→(3)→(4) (here and subsequently, these circled numbers in the figures will be shown in parentheses in this description). The winding coils are made by joining the turn portions 3c in the sequence from (1) to (4). And the coil that has thus been made from (1) to (4) is connected via an external bridge wire 3a to the coil that has been made from (5) to (8). And the coil that has been made from (5) to (8) is connected via an internal bridge wire 3b to the coil that has been made from (9) to (12). In the same way, the coil that has been made from (9) to (12) is connected via an external bridge wire 3a to the coil that has been made from (13) through (16).

FIG. 5 is a schematic figure in which the dispersal winding coils 7 are developed in a linear format as seen radially outwards from the interior of the stator 1. As described above, each of these repeated winding coils 7 consists of an external bridge wire, a turn portion, an internal bridge wire, and a turn portion in that order.

Figure 6A:
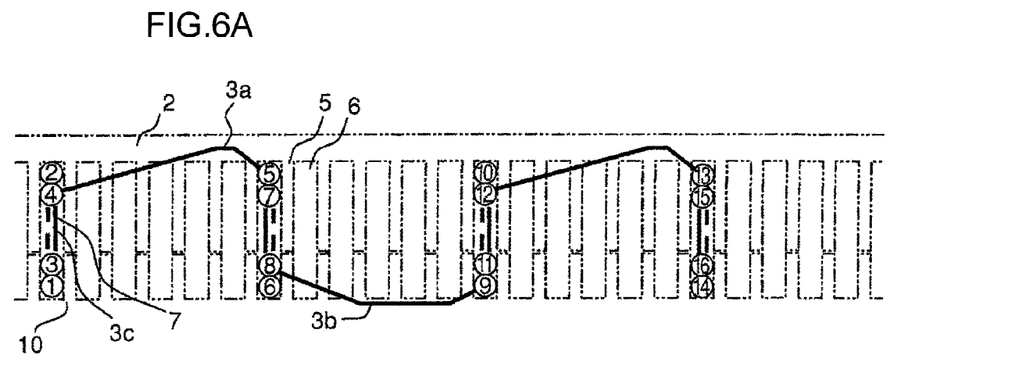
FIG. 6A, FIG. 6B, and FIG. 6C are developed views showing a process for forming one of the dispersal winding coils of this embodiment of the present invention.
Figure 6B:
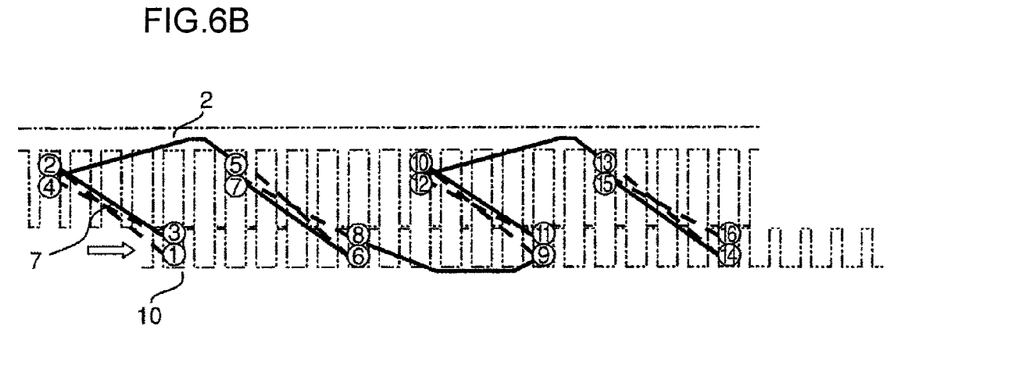
Figure 6C:
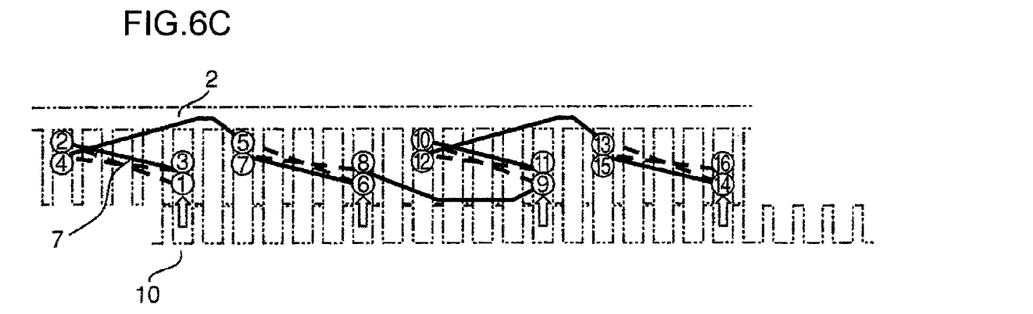

FIG. 6 is a schematic figure for explanation of the process of assembling the dispersal winding coils upon the core, and shows the stator core 2 and the dispersal winding coils 7 developed in a linear format as seen from the interior of the terminal portion side of the stator 1. The circled numbers have the same significance as in FIG. 4, and show the order of arrangement in which the dispersal winding coils 7 are formed.

FIG. 6A shows the way in which, before stretch forming, the dispersal winding coils 7 are inserted into the slots of the stator core 2 and into slots of an stretch forming jig 10: from (1) to (4) are put into the same slots, stacked along the radial direction. In a similar manner, from (5) to (8), from (9) to (12), and from (13) to (16) are each put into the same slots, stacked along the radial direction. For these dispersal winding coils 7 before stretch forming as well, in a similar matter to the above explanation using FIG. 4, each of the winding coils consists of an external bridge wire, a turn portion, an internal bridge wire, and a turn portion in that order.

FIG. 6B shows the way in which, after stretch forming, the dispersal winding coils are inserted into the slots of the stator core 2 and into the slots of the stretch forming jig 10, and shows the way in which, from the state shown in FIG. 6A, the stretch forming jig 10 is shifted rightwards in the drawing, and the dispersal winding coils 7 are formed with stretching. Due to this stretch forming, among the coils from (1) to (4) that are in the same slots stacked along the radial direction, the group consisting of the odd numbered ones (1) and (3) and the group consisting of the even numbered ones (2) and (4) are separated, and come to be disposed in different slots, stacked along the radial direction. In a similar manner, among the coils from (5) to (8), the coils from (9) to (12), and the coils (13) to (16), the groups consisting of the odd numbered ones in each and the groups consisting of the even numbered ones in each are separated, and come to be disposed in different slots, stacked along the radial direction.

FIG. 6C shows the way in which the even numbered groups of coils that were inserted into slots in the stretch forming jig 10 are inserted into the slots in the stator core 2. From the state shown in FIG. 6B, the even numbered groups of coils are pushed out from the slots of the stretch forming jig 10, i.e. are pushed upwards as seen in the figure and as shown by the arrow signs, and are inserted into slots in the stator core. By doing this, the dispersal winding coils shown in FIG. 4 are formed.

It should be understood that FIG. 6 is a schematic figure in which the stator core and the jig etc. are developed into a linear format; actually, the stator core 2, the stretch forming jig 10, and the dispersal winding coils are generally circular in shape.

Figure 7:
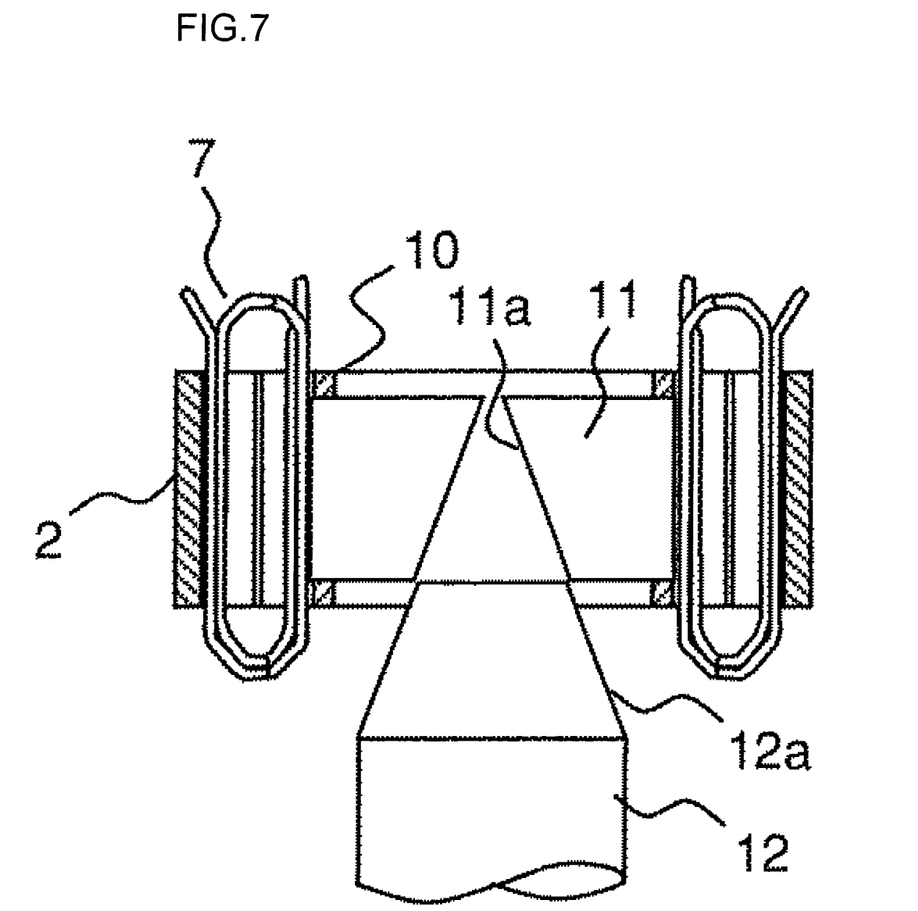
FIG. 7 is a sectional view showing a process of wiring assembly for an embodiment of the present invention.
Figure 8:
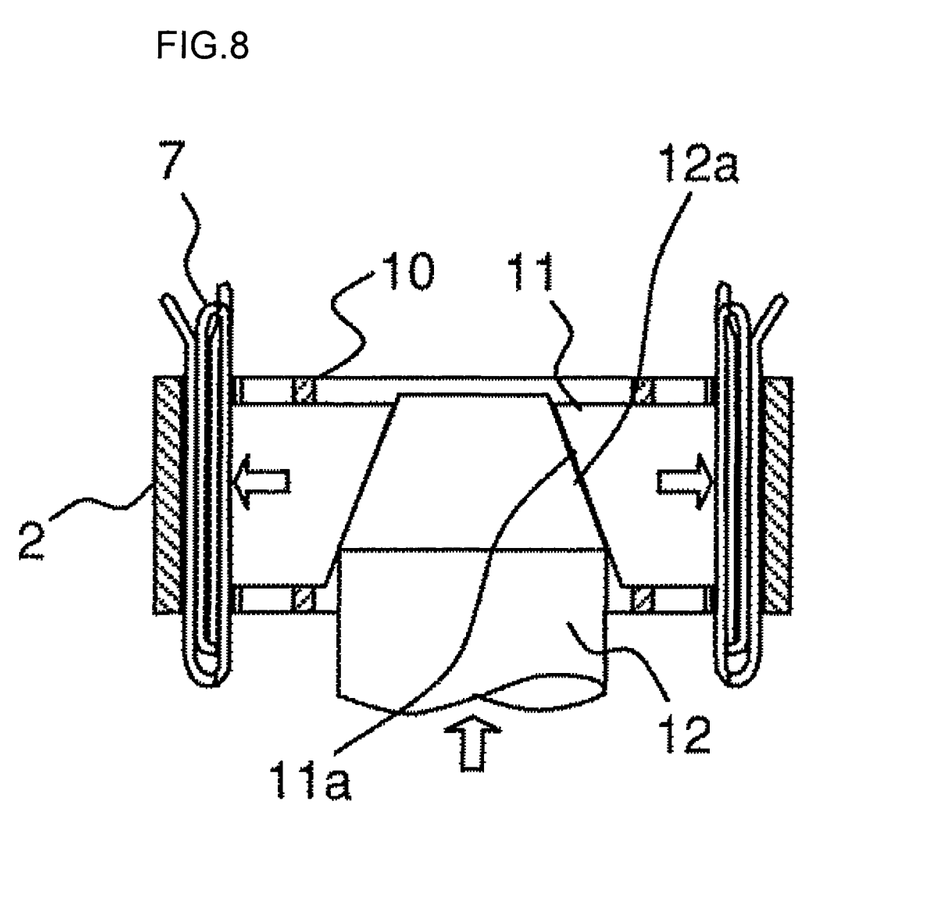
FIG. 8 is another sectional view showing a process of wiring assembly for an embodiment of the present invention.

FIGS. 7 and 8 are schematic sectional views showing a process by which the dispersal winding coils 7 are inserted into the slots of the stator core 2. FIG. 7 shows the way in which, after stretch forming, the dispersal winding coils 7 are inserted into the slots in the stator core 2 and the stretch forming jig 10. Blades 11, to the same number as the number of the slots, are provided to the stretch forming jig 10 for pushing the coils out from the slots in the stretch forming jig 10, and a pressurization rod 12 is installed below these blades 11. Furthermore, tapered portions 11a are formed upon these blades 11, and the pressurization rod 12 is also formed with a tapered portion 12a. And FIG. 8 shows the state in which the dispersal winding coils 7 have been pushed into the slots in the stator core 2. By shifting the pressurization rod upwards in the drawing, the blades 11 are shifted by the pressurization rod tapered portion 12a and the blade tapered portions 11a in the radially outward direction into the slots in the stator core 2, so that the dispersal winding coils 7 are inserted into those slots in the stator core.

The stator shown in FIG. 1 with the dispersal winding coils assembled thereupon is made by executing the procedure described above.

The details of the dispersal winding coils will now be described with reference to FIGS. 9 and 10.

Figure 9:
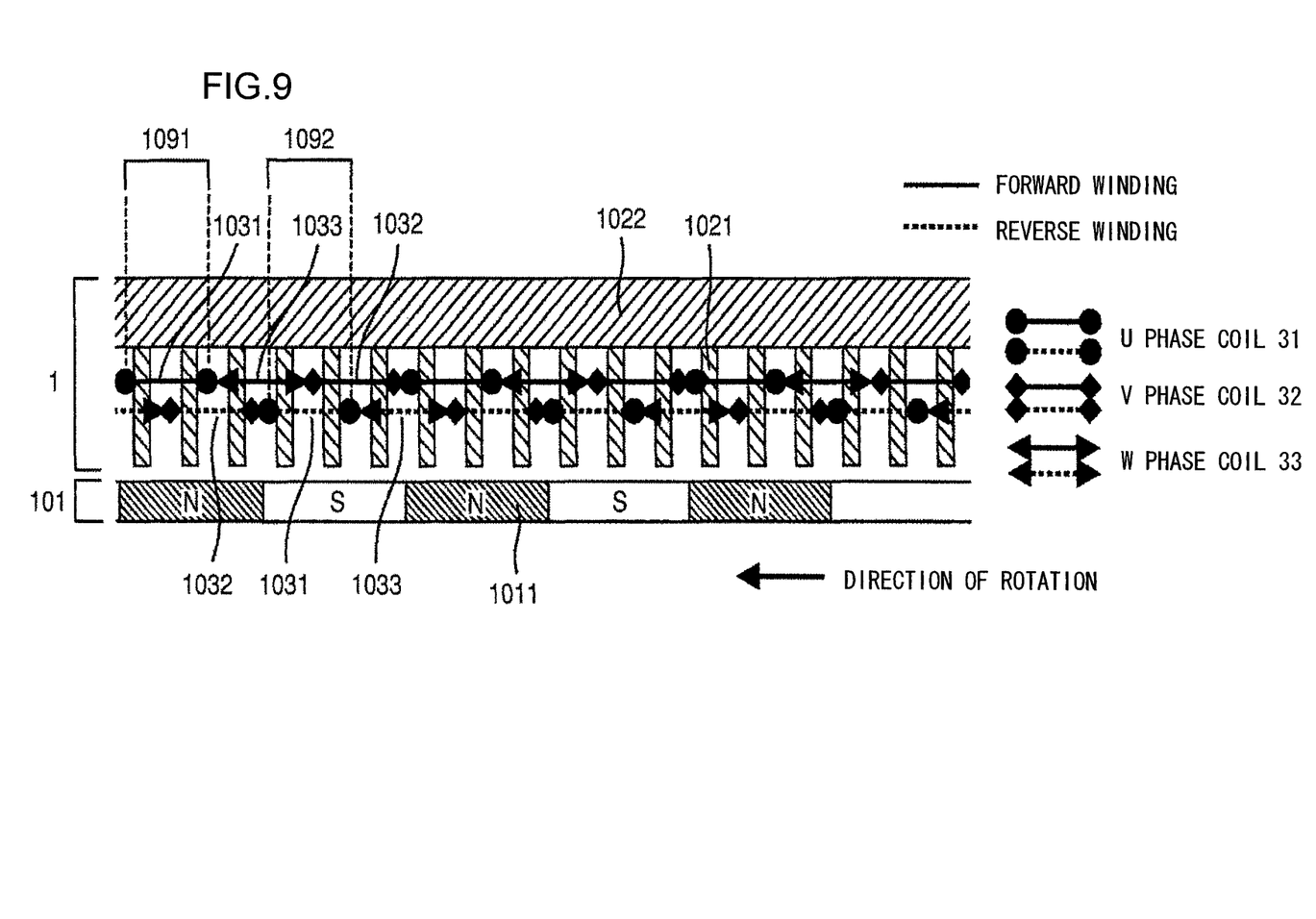
FIG. 9 is a conceptual figure showing a rotating electrical machine according to an embodiment of the present invention.

FIG. 9 is a conceptual figure showing a rotating electrical machine that is an embodiment of the present invention. This figure shows a portion of the rotating electrical machine developed into a linear format.

The rotating electrical machine is constituted with a rotor 101 and a stator 1, and the rotor 101 has a plurality of rotor magnetic poles 1011 and the stator 1 is provided with a plurality of teeth 1021 that constitute stator magnetic poles, with U-phase coils 1031, V-phase coils 1032, and W-phase coils 1033 being wound upon these teeth 1021. Here, the V-phase coils are defined as being coils in which AC current flows having a phase that is delayed by 120° (i.e. is advanced by 240°) with respect to the AC current that flows in the U-phase coils. Furthermore, the W-phase coils are defined as being coils in which AC current flows having a phase that is delayed by 240° (i.e. is advanced by 120°) with respect to the AC current that flows in the U-phase coils. The rotational direction of the rotor 101 is shown in FIGS. 9 and 10 by arrow signs.

The solid lines mean that the corresponding coils are wound forward (the wire is wound upon the teeth in the clockwise direction as seen from the radial interior), while the dotted lines mean that the corresponding coils are wound in the opposite direction (the wire is wound upon the teeth in the anti-clockwise direction as seen from the radial interior). While in FIG. 1 a case is shown in which the forward wound coils are wound in the positions more remote from the rotor, it would also be acceptable for them to be wound in the positions closer to the rotor. In the stator coil structure of this embodiment shown in this figure, two concentrated winding coils are arranged as superimposed upon one another in such positions that their electrical angles are deviated from one another by 180°, and their respective U-phase coils, V-phase coils, and W-phase coils are connected in series. To put this in another manner, this is a rotating electrical machine in which the rotor 101 is disposed within a vacant space within the stator 1, and the coils are wound so that the two stator magnetic poles 1091, 1092 created by turns of the coils in phase are disposed within a region having electrical angle width of 360°, the angular width in the circumferential direction of the coil turns that form each of these stator magnetic poles 1091, 1092 is less than the electrical angle width of 180°, and the coil turns that form these stator magnetic poles 1091, 1092 are provided so as not to be mutually overlapped; and, moreover, the coil turns are wound so that the two stator magnetic poles 1091 and 1092 have mutually opposite polarity. Here, the coil turns that create the two stator magnetic poles 1091, 1092 are provided as being mutually spaced apart by 180° of electrical angle. And the three stator magnetic poles for the U, V, and W phases are arranged so as to be mutually spaced apart by 60° of electrical angle. It should be understood that the V-phase coil is wound oppositely to the U-phase coil. Due to this, since 60°−180°=−120°, the V-phase coil is delayed in phase by 120° with respect to the U-phase coil. Furthermore, since the W-phase coil is wound in the same orientation as the U-phase coil, it is advanced in phase by 2×60°=120° with respect to the U-phase coil. Moreover, in this embodiment, the electrical angle width over one coil turn is 120°, so that, for the same phase, two coil turns are wound over a region of 240° electrical angle, in other words are wound over ⅔ of the entire number of teeth. This type of coil winding is termed dispersal winding.

Due to this coil structure, with the stator coil according to this embodiment, the extending circuit area of coil turns of each phase to which the magnetic flux of the rotor interlinks is twice as great as compared with a concentrated winding construction in which a single concentrated winding coil is provided within 360° of electrical angle, so that the efficiency of utilization of the coil is twice as great as with a concentrated winding. Since the same interlinkage magnetic flux is obtained as with a concentrated winding, if some single tooth is considered, in this embodiment, half of the number of coil turns wound around the teeth will suffice, as compared with the case of a concentrated winding. The coils for the U-phase, the V-phase, and the W-phase are decentralized twice as much as compared with the case of a concentrated winding, and moreover, in this construction, the coils are not wound upon all of the teeth as with the case of a distributed winding; rather, the coils are only wound upon ⅔ of the total number of teeth. Due to this it is possible to keep the coil inductance low, as compared with the case of a concentrated winding or of a distributed winding.

Furthermore since in this embodiment, as compared with the case of a concentrated winding, the coils are arranged so as to be distributed in a twice wider area, and also the U-phase coil, the V-phase coil, and the W-phase coil are so placed that they are approximately half overlapped to each other, accordingly reverse action upon the armature is distributed comparatively uniformly in the circumferential direction as compared with the case of a concentrated winding, so that, with this construction, the higher order harmonic component of electromagnetic force is reduced. Due to this, it is possible for this rotating electrical machine to function more quietly, as compared with the case of a concentrated winding.

Although the example of FIG. 9 is a construction in which one stator tooth is provided for each 60° of electrical angle, and the coil turns are wound with widths of 120° of electrical angle, it should be understood that it would also be possible to obtain similar beneficial effects with a construction in which one stator tooth is provided for each 30° of electrical angle, and the coil turns are wound with electrical angle widths of 90°, or 120°, or 150°.

Figure 10:
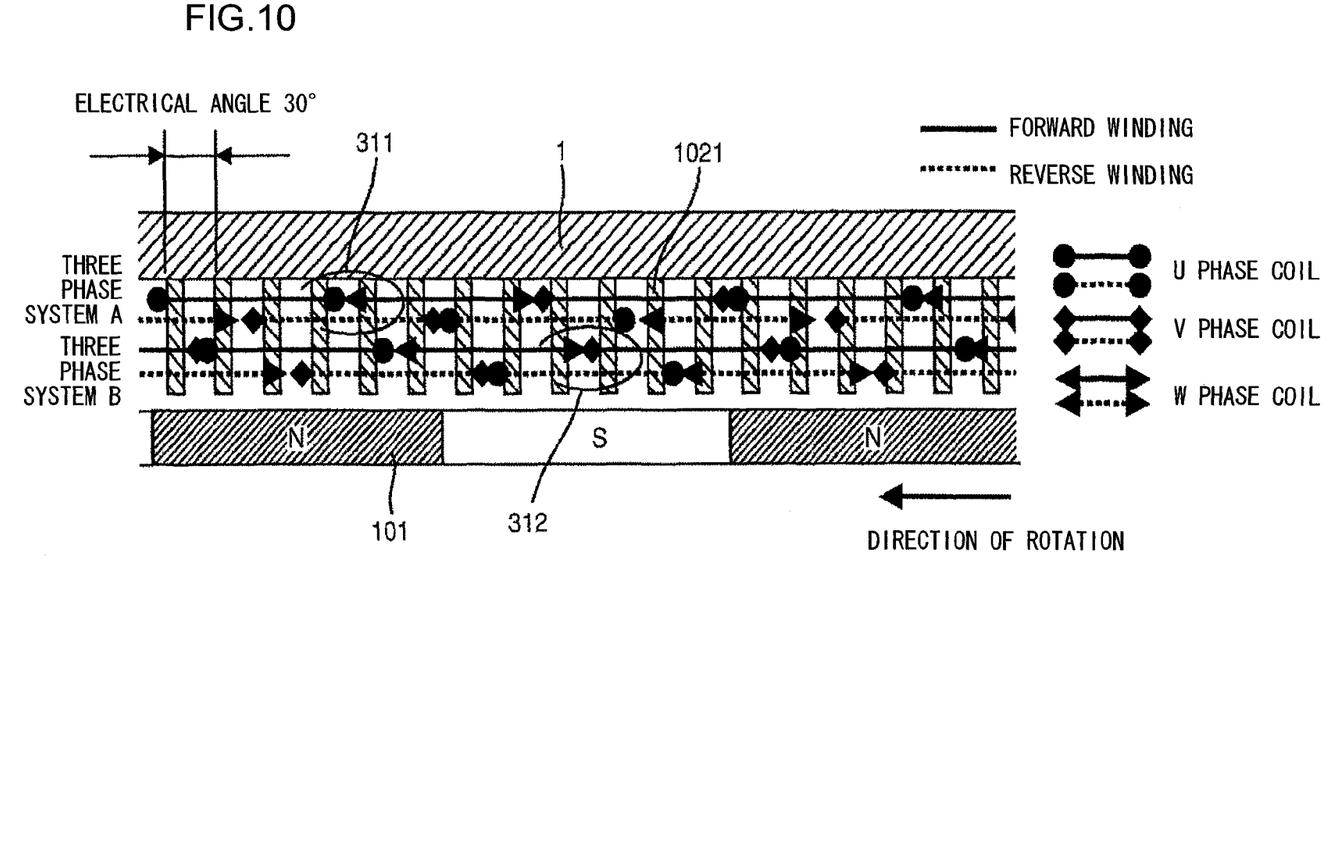
FIG. 10 is a conceptual figure showing a rotating electrical machine according to another embodiment of the present invention.

FIG. 10 is a conceptual figure showing another rotating electrical machine according to an embodiment of the present invention. The features thereof other than those described below are the same as in the embodiment described above.

In this embodiment, a construction is adopted in which the dispersal winding construction described above and a double three phase construction are combined. In other words, two of the winding groups shown in FIG. 9 are provided, and they are configured so that their phases are mutually shifted. As shown in FIG. 10, in this construction, the number of teeth 1021 is 12 for 360° of electrical angle, and the electrical angle phase shift between adjacent teeth is 30°. On portions of the teeth 1021 that are more outward in the radial direction, three-phase AC system coils are provided in a dispersal winding construction for one single three-phase AC system (three phase system A); and moreover, on portions of the teeth 1021 that are more inward in the radial direction, three-phase AC system coils are provided in a dispersal winding construction for another single three-phase AC system (three phase system B). The three phase system B is displaced by an electrical angle of 30° with respect to the three phase system A, and is connected in parallel therewith. In both of the three phase systems A and B, the coils are wound around, for example, four teeth.

Figure 11:
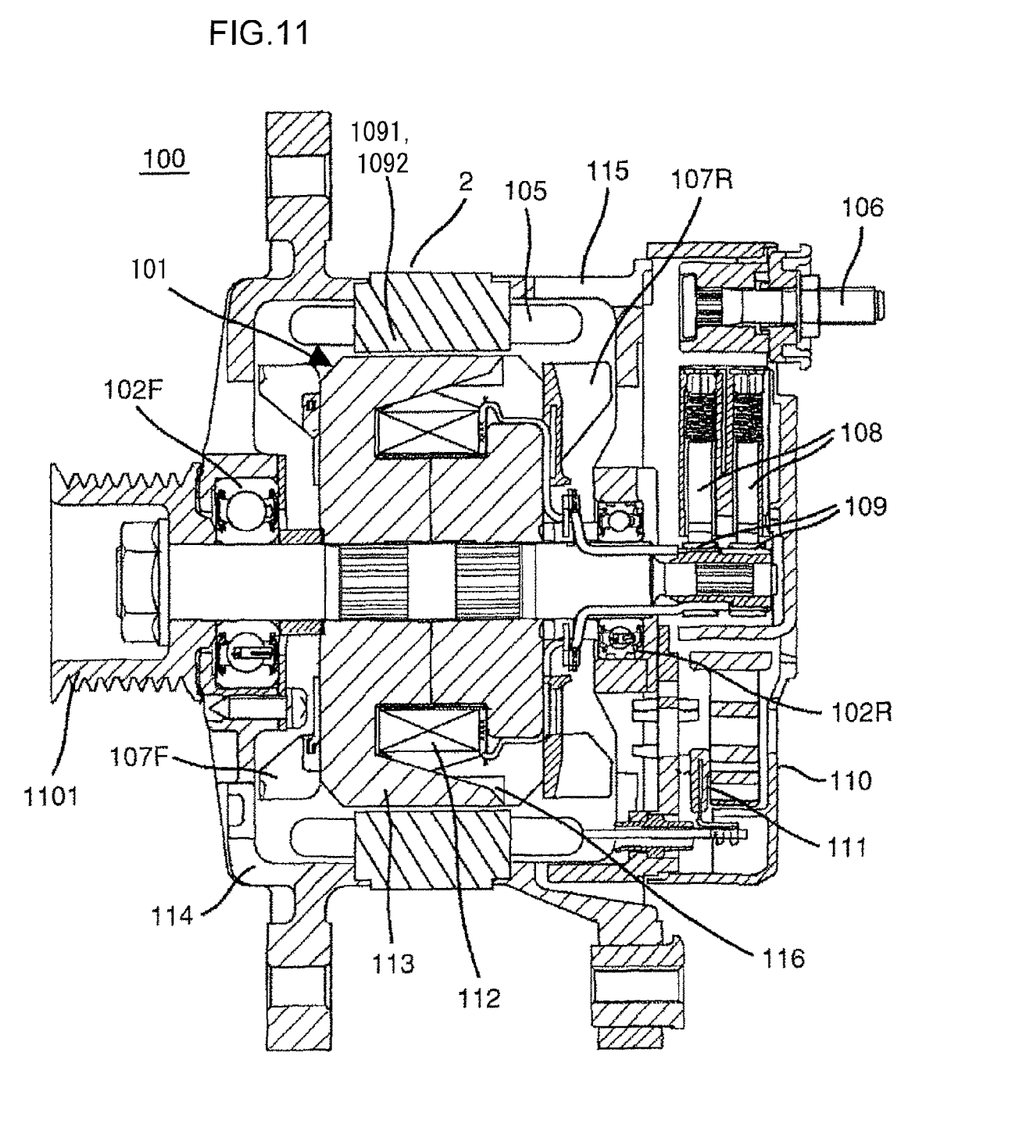
FIG. 11 is a sectional view of an air cooled type AC generator 100 for a vehicle, according to an embodiment of the present invention.

FIG. 11 is a sectional view of an air cooled type AC generator 100 for a vehicle according to an embodiment of the present invention. A claw shaped magnetic poles 113 are provided outward around the shaft of a rotor 101, and a field coil 112 is disposed in the midst within these poles 113. A pulley 1101 is fixed to the end of the shaft, and slip rings 109 are provided at the opposite end thereof for supplying electricity to the field coil 112. Furthermore, a front cooling fan 107F and a rear cooling fan 107R are provided to the rotor 101 at the two end surfaces of the claw shaped magnetic pole 113, and these fans 107F, 107R rotate along with the rotor 101. Moreover, a plurality of permanent magnets 116 that are provided to the claw shaped magnetic poles 113 serve the purpose of auxiliary excitation in order to give an additional magnetic flux to the field coil magnetic flux. On the other hand, a stator 1 comprises stator magnetic poles 1091, 1092 and stator windings, and is disposed so as to oppose the rotor 101 with a slight gap between them. The stator 1 is supported by a front bracket 114 and a rear bracket 115, with the rotor 101 being rotatably supported by these brackets 114 and 115 via respective bearings 102F and 102R. The slip rings 109 described above are contacted against brushes 108, and thereby electrical power is supplied to the rotor 101. And the stator winding is built as a three state winding according to the embodiment described above, with the lead wires of each of its windings being connected to a rectification circuit 111. This rectification circuit 111 comprises rectification elements such as diodes or the like, and is built as a full wave rectification circuit. For example, in the case of diodes, their cathode side terminals are connected to a terminal 106. Moreover, their anode side terminals are electrically connected to the main body of this vehicle AC generator. Finally, a rear cover 110 serves the role of covering over and protecting the rectification circuit 111.

Next, the operation of this generator as it generates electricity will be explained. Usually an engine (not shown in the figures) and this vehicle AC generator 100 are connected by a belt (also not shown). The vehicle AC generator is connected to the engine by a pulley 1101 and a belt, so that its rotor 101 rotates together with the rotation of the engine. By an electrical current flowing in the field coils 112 that are provided at the central portion of the claw shaped magnetic pole 113 of the rotor 101, these claw shaped magnetic poles 113 are magnetized, and, due to the rotation of the claw poles 113, three phases of induced electromotive force are thereby generated in the stator coils. These voltages are full wave rectified by the rectification circuit 111 described above, and thereby a DC voltage is generated. The positive side of this DC voltage is connected to the terminal 106, and furthermore this terminal 106 is connected to a battery (not shown in the figures). The field magnet current is controlled so that the DC voltage after rectification becomes equal to a voltage that is suitable for charging the battery; the details of this arrangement are omitted.

Figure 12A:
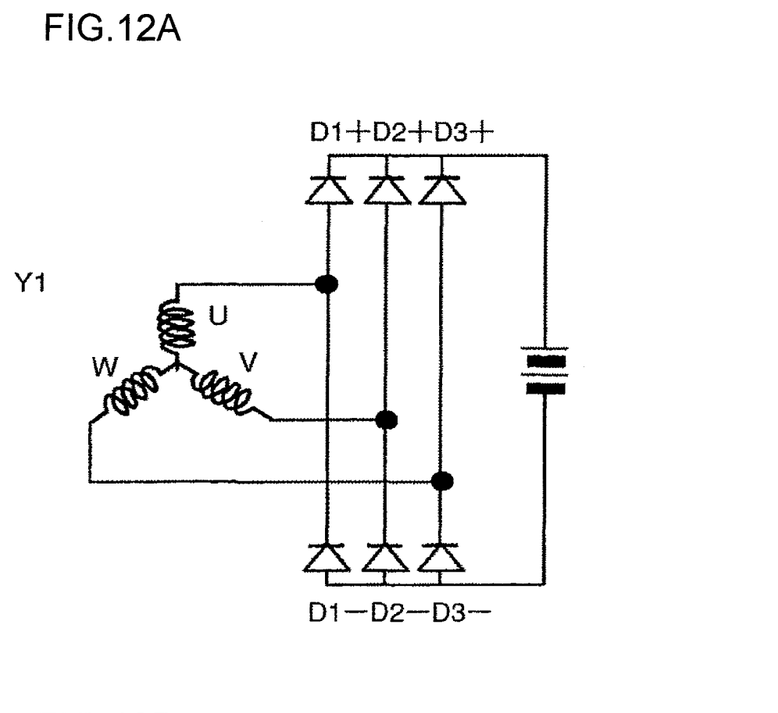
FIGS. 12A and 12B show three-phase rectification circuits suitable for the windings shown in FIG. 11.
Figure 12B:
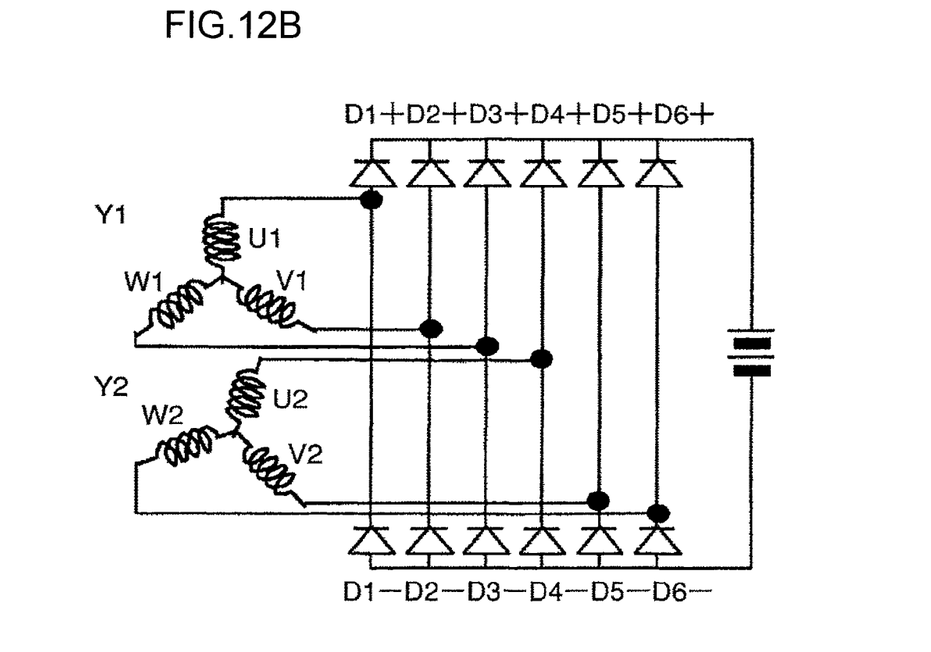

FIG. 12 shows two three-phase rectification circuits that are suitable for use with the windings shown in FIG. 11 and described above. FIG. 12A corresponds to the embodiment of FIG. 9, while FIG. 12B corresponds to the embodiment of FIG. 10. In each case, the coils for the three phases are connected in a three phase star connection. The terminals at the sides of the three phase coils having opposite polarity to their mutual connection point are connected to six diodes D1+ . . . D3−, as shown in the figures. Furthermore, the cathodes of the diodes on the positive side are connected together, and are connected to the positive terminal of the battery. In a similar manner, the anodes of the diodes on the negative side are connected together, and are connected to the negative terminal of the battery.

In FIG. 12B, the voltages of the U1 winding and the U2 winding of the three phase winding, that are electrically independent, are equal, but their phases are different by 30°, and a voltage of larger one of these two voltages is adopted in effect, so that the voltage finally carries a ripple of 30° in width.

It should be understood that, while here an example of a star connection is shown, it would also be acceptable to employ a delta connection. If such a delta connection is employed, then the beneficial effect is obtained that it is possible to enhance the induced voltages in the coils by 11.5% as compared to the case of a star connection.

It should be understood that the embodiment described above, or, to put it in another manner, this rotating electrical machine that has stator coils in which a single three phase AC electrical current flows, teeth upon which this coil is wound, a stator that includes these teeth and the base part of the stator core for returning the magnetic flux flowing in the teeth, and a rotor that has magnetic poles opposing the teeth, may be a rotating electrical machine in which the stator coils that are wound upon the teeth are only a U-phase coil and a V-phase coil, or only a V-phase coil and a W-phase coil, or only a W-phase coil and a U-phase coil.

Furthermore, a rotating electrical machine that comprises stator coils in which a single three phase AC electrical current flows in each coil, teeth upon which this coil is wound, a stator that includes these teeth and the base part of the stator core for returning the magnetic flux flowing in the teeth, and a rotor that has magnetic poles opposing the teeth, and in which the U-phase coils, the V-phase coils, and the W-phase coils each in a concentrated winding coil arrangement are disposed radially outward in the teeth, and in which the U-phase coils, the V-phase coils, and the W-phase coils each in a concentrated winding with reversed winding direction are disposed radially inward, and, for each phase, the coils including the reversely wound coils are connected in series.

Yet further, this rotating electrical machine may be a rotating electrical machine that has two three-phase coil systems comprising a U-phase coil, a V-phase coil, and a W-phase coil, and in which the electrical angle phase differences between the coil systems are set to around 30°, or within the range from 20° to 40°.

The above described embodiments are examples, and various modifications can be made without departing from the scope of the invention.

What is claimed is:

1. A rotating electrical machine comprising:
a rotor in which a plurality of magnetic poles are provided in a circumferential direction, and
a stator within which the rotor is disposed with a gap against the stator, wherein
in the stator, two stator magnetic poles are formed by winding coils of one phase and by a stator core of the stator, within 360° of electrical angle defined by the magnetic poles of the rotor,
the coils that form respective stator magnetic poles have angular widths in the circumferential direction of less than 180° of electrical angle,
the coils that form the respective two stator magnetic poles are provided so as not to mutually overlap and are wound so that adjacent ones of the stator magnetic poles have mutually opposite polarities,
a plurality of coils of one phase, including a first coil, a second coil, and a third coil, are formed with one conducting wire, and
only at a coil end portion at one side of the stator, an external bridge wire connecting the first coil and the second coil extends from an inner circumferential side of a slot of the stator relative to a turn portion of the first coil to an outer circumferential side of a slot of the stator relative to a turn portion of the second coil, and an internal bridge wire connecting the second coil and the third coil extends from an outer circumferential side of a slot of the stator relative to a turn portion of the second coil to an inner circumferential side of a slot of the stator relative to a turn portion of the third coil.

2. A rotating electrical machine according to claim 1, wherein the external bridge wire or the internal bridge wire is formed in a letter-S shape as seen along an axial direction.

3. A rotating electrical machine according to claim 1, wherein the external bridge wire or the internal bridge wire is formed in a peaked shape as seen along radial direction.

4. A rotating electrical machine according to claim 1, wherein the external bridge wire or the internal bridge wire corresponds to mutually different phases.

5. A rotating electrical machine comprising:
a rotor in which a plurality of magnetic poles are provided in a circumferential direction, and
a stator within which the rotor is disposed with a gap against the stator, wherein
the stator includes a plurality of continuous coil sets in which a continuous coil set is formed with one conducting wire and includes a plurality of coils and bridge wires for connecting two adjacent coils of the continuous coil set,
two adjacent coils in the continuous coil set are wound in different winding directions relative to each other,
each coil in the continuous coil set has a circumferential size of less than 180° of electrical angle defined by the magnetic poles of the rotor,
two adjacent coils in the continuous coil set are arranged within 360° of electrical angle with both coils not being overlapped, and
the bridge wires for connecting two adjacent coils of the continuous coil set are arranged only on one side of the stator core in its axial direction, in which a position of a first bridge wire connecting two adjacent initial coils of three consecutive coils and a position of a second bridge wire connecting two adjacent final coils of the three consecutive coils are arranged not to intersect with each other, and the positions of the first and second bridge wires in a radial direction of the stator alternate to each other between an external position and an internal position.

* * * * *